US009620926B2

(12) United States Patent
Watanabe

(10) Patent No.: US 9,620,926 B2
(45) Date of Patent: Apr. 11, 2017

(54) LASER MACHINING APPARATUS CHANGING OPERATION BASED ON LENGTH OF POWER-DOWN TIME

(71) Applicant: FANUC CORPORATION, Minamitsuru-gun, Yamanashi (JP)

(72) Inventor: Takeshi Watanabe, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 14/683,421

(22) Filed: Apr. 10, 2015

(65) Prior Publication Data
US 2015/0290745 A1    Oct. 15, 2015

(30) Foreign Application Priority Data

Apr. 11, 2014 (JP) ................................. 2014-082337

(51) Int. Cl.
| | | |
|---|---|---|
| *H01S 3/104* | (2006.01) | |
| *H01S 3/097* | (2006.01) | |
| *H01S 3/036* | (2006.01) | |
| *H01S 3/10* | (2006.01) | |

(52) U.S. Cl.
CPC .......... *H01S 3/104* (2013.01); *H01S 3/09702* (2013.01); *H01S 3/036* (2013.01); *H01S 3/10069* (2013.01)

(58) Field of Classification Search
CPC ... H01S 3/09702; H01S 3/10069; H01S 3/104
See application file for complete search history.

(56) References Cited

U.S. PATENT DOCUMENTS 5,039,998 A * 8/1991 Seto ....................... G06K 15/12
347/247
6,388,852 B1 * 5/2002 Bobash ................... G06F 1/305
361/111

(Continued)

FOREIGN PATENT DOCUMENTS

| JP | 62181480 | 8/1987 |
|---|---|---|
| JP | 63288080 | 11/1988 |

(Continued)

*Primary Examiner* — Tu B Hoang
*Assistant Examiner* — Erin McGrath
(74) *Attorney, Agent, or Firm* — RatnerPrestia

(57) ABSTRACT

A laser machining apparatus includes: a laser oscillator; a control device controlling the laser oscillator; a power-down detection unit detecting a decrease in supply power; a time measurement unit measuring power-down time until the supply power is returned to a predetermined value from when the supply power is decreased under the predetermined value; an electricity storage unit supplying electric power to the control device upon a power outage; and equipment operating abnormally when the supply power is decreased under the predetermined value, and recovering from an abnormal operation when a state of the supply power being smaller than the predetermined value continues for a first predetermined period or longer, the control device stopping the laser machining apparatus when the power-down time is smaller than the first predetermined period and not stopping the laser machining apparatus when the power-down time is equal to or larger than the first predetermined period.

6 Claims, 12 Drawing Sheets

(56) References Cited

U.S. PATENT DOCUMENTS

| | | | |
|---|---|---|---|
| 7,557,463 B2 * | 7/2009 | Yoshida | G06F 1/30 307/39 |
| 2005/0111504 A1 * | 5/2005 | Nishikawa | B23K 26/702 372/38.01 |
| 2013/0220981 A1 | 8/2013 | Kumaoka et al. | |

FOREIGN PATENT DOCUMENTS

| JP | 02-076021 A | 3/1990 |
|---|---|---|
| JP | 02130981 | 5/1990 |
| JP | 03246982 | 11/1991 |
| JP | 05-000199 A | 1/1993 |
| JP | 07-095253 | 4/1995 |
| JP | 07142794 | 6/1995 |
| JP | 2002319723 | 10/2002 |
| JP | 2003-152250 A | 5/2003 |

* cited by examiner

LASER MACHINING APPARATUS CHANGING OPERATION BASED ON LENGTH OF POWER-DOWN TIME

CROSS-REFERENCE TO RELATED APPLICATIONS

This application is a new U.S. patent application that claims benefit of JP 2014-082337, filed on Apr. 11, 2014, the entire content of JP 2014-082337 is hereby incorporated by reference.

FIELD OF THE INVENTION

The present invention relates to a laser machining apparatus, and in particular, to a laser machining apparatus that changes an operation by determining whether a laser oscillator is stopped based on power-down time.

BACKGROUND OF THE INVENTION

In many cases, a power circuit of a control unit included in the laser machining apparatus is mounted to an electric storage component such as a capacitor, the configuration being such that power supply voltage of the control unit is maintained even when a power-down occurs for a short period of time. However, if an abnormality occurs in equipment such as an inverter and a power source for excitation, the equipment being operated by an external power source and included in the laser machining apparatus, a recovery to the same state as before the power-down requires a large amount of time. Hence, there is a decrease in the operating ratio of the laser machining apparatus in regions having a high frequency of the power-down.

There are a variety of methods for protecting the apparatus from the power-down of the external power source. For example, one known method is a method of causing an operation by an internal power source when a power outage occurs, measuring a period of power outage, after the power has been restored, continuing the operation when the power outage time is shorter than a predetermined period of time and stopping the operation when the power outage time is longer than the predetermined period of time (e.g., Japanese Unexamined Patent Publication No. 5-000199 (JP 5-000199 A)). This prior art includes: a storage means for storing a progress status of an operation process; a detection means for detecting whether electric power is supplied from an external power source; a time measurement means for measuring power outage time of the external power source; an internal power source for back up the storage means and the time measurement means when the power outage of the external power source occurs; and a control means for continuing the interrupted operation process when the power outage time is within the predetermined period of time and stop the operation process when exceeding the predetermined period of time upon an interruption of the operation process due to the power outage of the external power source and upon restarting supplying the power. This prior art is targeted on electric products for home use and is difficult to be applied in an as-is state to the laser machining apparatus mounted to a CNC, a gas laser oscillator, an inverter and a laser power source.

Further, a power restoration processing method of a power source for an information processing apparatus is known as the power restoration processing method of the power source (e.g., Japanese Examined Patent Publication No. 7-095253 (JP 7-095253 B)). This prior art includes a power source unit, a power source control unit and an information processing unit, in a power restoration processing method of a power source for an information processing apparatus with the power source control unit controlling a supply of the power source to the information processing unit from the power source unit, the configuration being such that the power source control unit includes: a timer means for starting of a power outage signal; a power outage processing unit for storing a power outage state in storage means through the power outage signal; and a power restoration processing unit for starting the power outage signal that is off when a time-out output of the timer means occurs, and the power restoration processing unit for generating a control signal for instructing the power source unit to switch on the power source when reading a power outage state of the storage means upon the start-up. This prior art is directed to an information processing apparatus and is difficult to be applied in the as-is state to the laser machining apparatus mounted to the CNC, the gas laser oscillator, the inverter and the laser power source. This prior art performs a power restoration process when the power outage time is shorter than the time-out time. However, the prior art does not mention a case of the power outage time being longer than the time-out time.

When powering down of the laser machining apparatus, an abnormality occurs in the inverter and the power source for the excitation of a laser gas blowing device mounted in the laser oscillator when the power-down time is short, and this abnormal state is maintained even after the power restoration and is not cancelled unless these equipment are stopped. Conventionally, when an abnormality occurs in the equipment of the laser machining apparatus due to the power-down, the recovery to the state before the occurrence of the power-down involves, at first, cancelling the abnormality of the equipment by stopping the laser machining apparatus and performing the same start-up as normal, resulting in a necessity for a labor and a large amount of time.

The laser machining apparatus being invariably stopped irrespective of the power-down time also requires its start-up operation in the same way as described above for the recovery to the state before the power-down, resulting in the necessity of labor and a large amount of time.

It is an object of the present invention to provide a laser machining apparatus recovering to a state before power-down in a short period of time after power restoration of an external power source temporarily decreasing in its electric power.

SUMMARY OF THE INVENTION

A laser machining apparatus according to one embodiment of the present invention includes: a laser oscillator; a control device configured to control the laser oscillator; a power-down detection unit configured to detect a decrease in supply power supplied to the control device and the laser oscillator from an external power source; a time measurement unit configured to measure a period of power-down time until the supply power is returned to a predetermined value from when the supply power is decreased under the predetermined value; an electricity storage unit configured to supply electric power to the control device when the electric power decreases; and equipment provided within the laser oscillator, operating abnormally when the supply power is decreased under the predetermined value, and recovering from an abnormal operation when a state of the supply power being smaller than the predetermined value continues for a first predetermined period of time or longer, the apparatus being configured so that the control device stops the laser machining apparatus or the equipment when the power-down time is smaller than the first predetermined period of time and does not stop the laser machining apparatus or the equipment when the power-down time is equal to or larger than the first predetermined period of time.

Further, a laser machining apparatus according to another embodiment of the present invention includes: a laser oscillator; a control device configured to control the laser oscillator; a power-down detection unit configured to detect a decrease in supply power supplied to the control device and the laser oscillator from an external power source; a time measurement unit configured to measure a period of power-down time until the power supply is returned to a predetermined value from when the supply power is decreased under the predetermined value; an electricity storage unit configured to supply electric power to the control device when the electric power decreases; and equipment provided within the laser oscillator, operating abnormally when the supply power is decreased under the predetermined value, and recovering from the abnormal operation when a state of the supply power being smaller than the predetermined value continues for a first predetermined period of time or longer, the apparatus being configured so that the laser machining apparatus or the equipment is stopped when the equipment is in an abnormal state along with a return of the electric power and is not stopped when the equipment is not in the abnormal state along with the return of the electric power.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

A laser machining apparatus according to the present invention will hereinafter be described with reference to the accompanying drawings. It may be, however, noted that the technical range of the present invention can, without being limited to the embodiment of the present invention, encompass the inventions disclosed in the scope of claims and equivalents thereof.

[First Embodiment]

Figure 1:
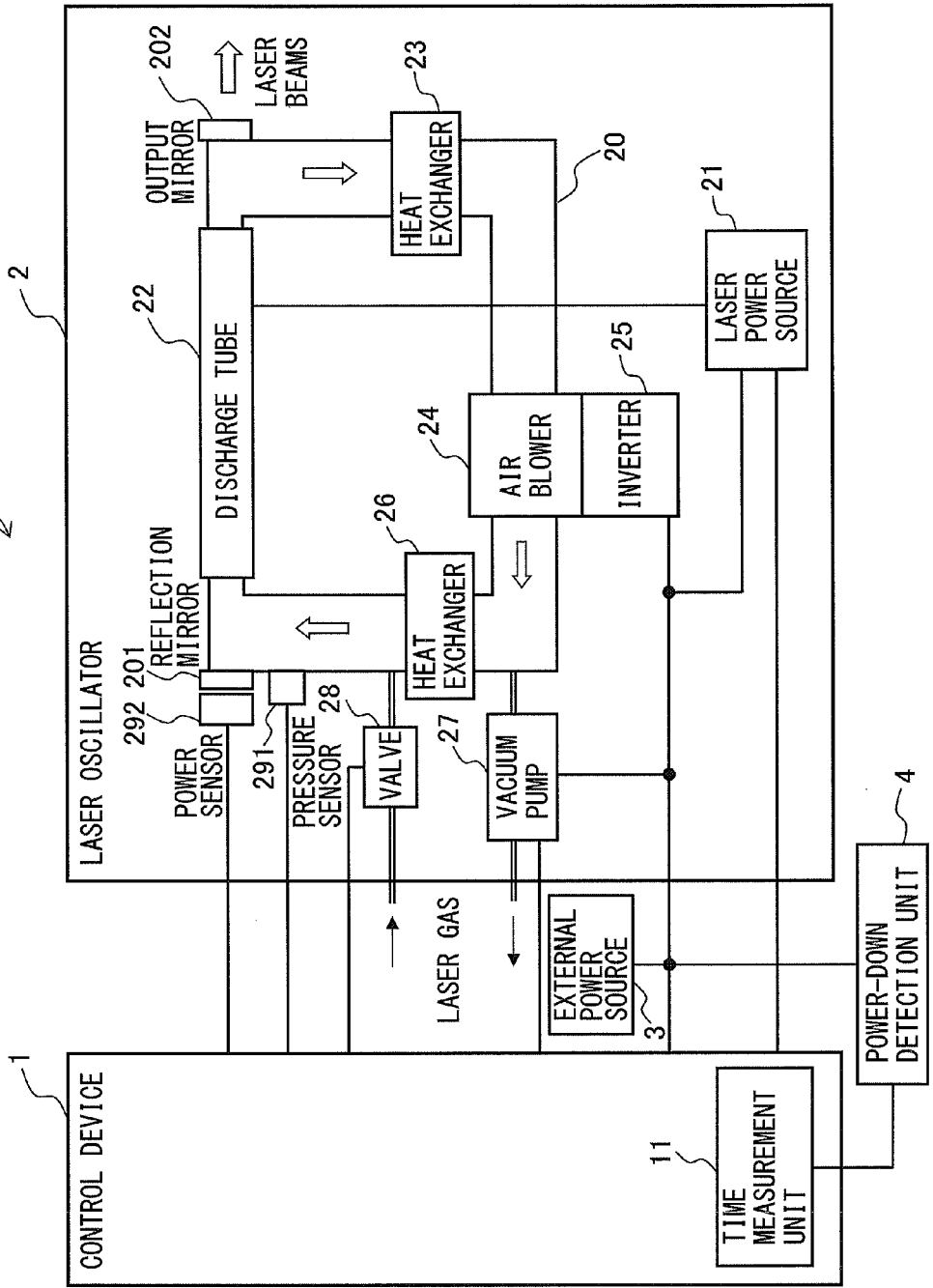
FIG. 1 is a block diagram of a laser machining apparatus according to a first embodiment of the present invention.

The laser machining apparatus according to the first embodiment will be described. FIG. 1 illustrates a block diagram of the laser machining apparatus according to the first embodiment of the invention. A laser machining apparatus 101 according to the first embodiment of the invention includes equipment such as: a laser oscillator 2; a control device 1 configured to control the laser oscillator 2; a power-down detection unit 4 configured to detect a decrease in electric power supplied from an external power source 3 to the control device 1 and the laser oscillator 2; a time measurement unit 11 configured to measure a period of power-down time until the supply power is returned to a level equal to or larger than a predetermined value from when the supply power is decreased down to a level smaller than the predetermined value; an electricity storage unit (not shown) configured to supply the control device 1 with the electric power when the electric power decreases; and an inverter 25, provided within the laser oscillator 2, of which an operation becomes abnormal when the supply power is decreased under the predetermined value and recovers from an abnormal operation when a state of the supply power being smaller than the predetermined value continues for a period of first predetermined time or longer, the control device 1 being characterized by stopping the laser machining apparatus 101 or equipment such as the inverter 25 when the power-downtime is smaller than the first predetermined time, and not stopping the laser machining apparatus 101 or the equipment such as the inverter 25 when the power-down time is equal to or larger than the first predetermined time.

The laser oscillator 2 includes an electric discharge tube 22 to excite a laser gas, reflecting mirrors 201 provided at both ends of the electric discharge tube 22, and an output mirror 202, an optical output being taken out of the output mirror 202 by performing a multiple amplification feedback of light between the reflecting mirrors 201 and the output mirror 202. An intensity of the optical output to be taken out is detected by a power sensor 292. The laser power source 21 supplies energy to the electric discharge tube 22. An air blower 24 causes the laser gas to flow through a flow path 20 via two heat exchangers 23, 26 in an arrow direction in FIG. 1. A pressure of the laser gas within the flow path 20 is detected by a pressure sensor 291. The laser gas is introduced into the flow path 20 by opening and closing a valve 28. The laser gas is discharged from the flow path 20 by a vacuum pump 27. The air blower 24 is driven by the inverter 25.

Each equipment provided inside the laser oscillator 2 has a property that the operation thereof becomes the abnormal state when the supply power decreases under the predetermined value, and the abnormal state is cancelled when the state of the supply power being smaller than the predetermined value continues for the first predetermined time or longer.

The external power source 3 supplies the electric power to the control device 1 and the laser oscillator 2. To be more specific, the external power source 3 supplies the electric power to the laser power source 21, the inverter 25 and the vacuum pump 27 within the laser oscillator 2.

The control device 1 receives detection data from the pressure sensor 291 and the power sensor 292. Further, the control device 1 controls the laser power source 21, the vacuum pump 27 and the valve 28.

The power-down detection unit 4 always monitors the supply power supplied to the control device 1 and the laser oscillator 2 from the external power source 3, and detects whether the supply power decreases.

The control device 1 is provided with the time measurement unit 11. The time measurement unit 11 measures the period of power-down time until the supply power is restored to the predetermined value or larger from when the supply power is decreased under the predetermined value.

The laser machining apparatus according to the first embodiment of the invention has the configuration described above, and is characterized in that the control device 1 stops the laser machining apparatus or the equipment when the power-down time is shorter than the first predetermined time and does not stop the laser machining apparatus or the equipment when the power-down time is equal to or longer than the first predetermined time. Next, an operation of the laser machining apparatus according to the first embodiment of the invention will be described.

Figure 2:
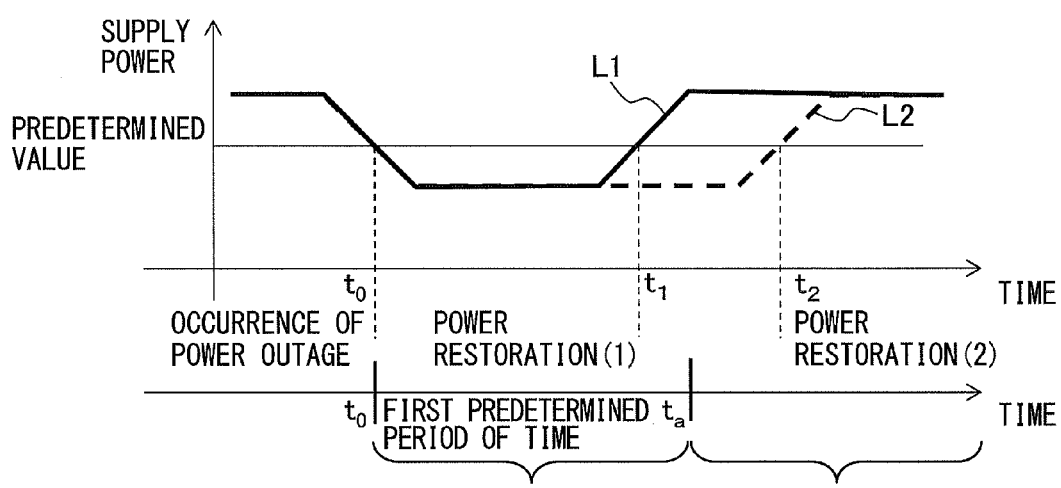
FIG. 2 is a diagram illustrating a relationship between power-down of supply power and power restoration timing in the laser machining apparatus according to the first embodiment of the present invention, and an operation state of equipment included in the laser machining apparatus.

FIG. 2 illustrates a relationship between the decrease in the supply power, power restoration timing in the laser machining apparatus according to the first embodiment of the invention, and an operation state of the equipment included in the laser machining apparatus. A temporal variation of the supply power supplied from the external power source 3 is depicted at an upper area in FIG. 2. A solid line L1 and a dotted line L2, as will be described later on, represent how the power restoration timing differs, the timing being when the electric power once decreasing down to the predetermined value or under is restored to the predetermined value or above. To begin with, an assumption is that a power outage occurs at timing $t_0$ and the supply power before the occurrence of the power outage is equal to or larger than the predetermined value. The power is restored after an elapse of a certain period of time subsequent to the occurrence of the power outage at the timing $t_0$; however, two cases are herein exemplified. In a first power restoration case (1), the power is assumed to be restored at timing $t_1$. On the other hand, in a second power restoration case (2), the power is assumed to be restored at timing $t_2$ ($t_2 > t_1$).

Herein, as described above, the operation of the equipment provided inside the laser oscillator 2 becomes the abnormal state when the supply power decreases down under the predetermined value, and the abnormal state is cancelled when the state of the supply power being smaller than the predetermined value continues for the first predetermined time ($t_a-t_0$) or longer. FIG. 2 illustrates the timing $t_0$ when the power outage occurs along with the timing $t_a$ when the first predetermined time elapses.

The power restoration (1) is, as depicted in FIG. 2, such that the timing $t_1$ of the power restoration is earlier than the timing $t_a$ when the first predetermined time elapses ($t_1 < t_a$). At this time, the operation of the equipment provided inside the laser oscillator 2 becomes the abnormal state when the supply power decreases down under the predetermined value, and the abnormal state is cancelled when the state of the supply power being smaller than the predetermined value continues for the first predetermined time ($t_a-t_0$) or longer. Thus, when the power is assumed to be restored at the timing $t_1$, it follows that the state of the supply power being smaller than the predetermined value does not continue for the first predetermined time ($t_a-t_0$) or longer at the timing $t_1$, and hence the equipment still remains in the abnormal state. Accordingly, in such a case, the laser oscillator or the equipment is stopped. Namely, if the equipment is in the abnormal state when the power is restored, the laser machining apparatus or the equipment is stopped. A procedure being thus done, it is possible to cancel the abnormal state retained by the equipment of the laser machining apparatus, and the laser machining apparatus can return to the same state as before the power decreases by starting up the laser machining apparatus.

The power restoration (2) is as depicted in FIG. 2, such that the timing $t_2$ of the power restoration is later than the timing $t_a$ when the first predetermined time elapses ($t_2 > t_a$). At this time, the operation of the equipment provided inside the laser oscillator 2 becomes the abnormal state when the supply power decreases down under the predetermined value, and the abnormal state is cancelled when the state of the supply power being smaller than the predetermined value continues for the first predetermined time ($t_a-t_0$) or longer. Thus, when the power is assumed to be restored at the timing $t_2$, it follows that the state of the supply power being smaller than the predetermined value continues for the first predetermined time ($t_a-t_0$) or longer at the timing $t_2$, and hence the abnormal state of the equipment is cancelled. Accordingly, in such a case, the laser machining apparatus can return to the same state as before the power decreases without stopping the laser machining apparatus by automatically cancelling the abnormal state retained by the equipment. In other words, when the equipment is not in the abnormal state when the power is restored, neither the laser machining apparatus nor the equipment is stopped.

As described above, it is determined whether the equipment is stopped corresponding to the state of the equipment at the timing when the external power source is restored, and hence it is feasible to take a proper measure corresponding to the state of the equipment and quickly recover after the power restoration.

Figure 3:
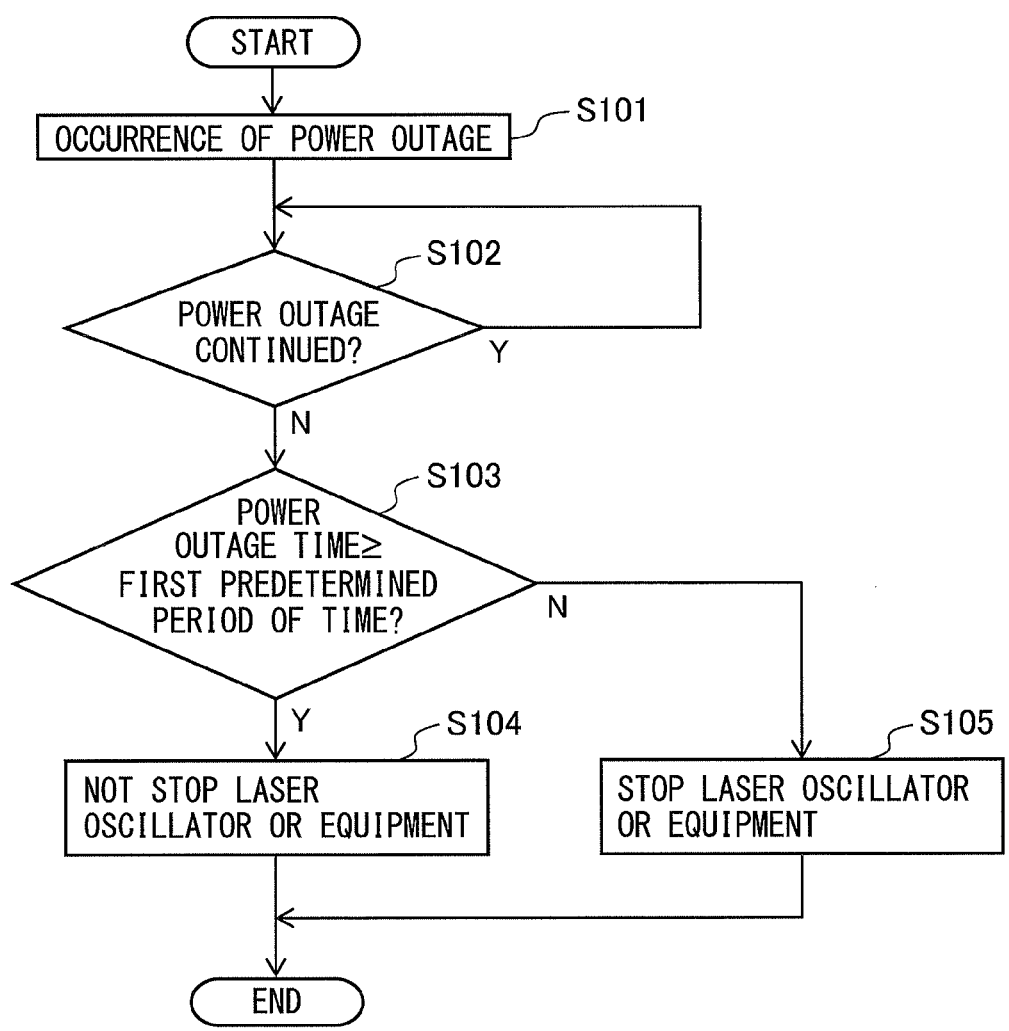
FIG. 3 is an explanatory flowchart of an operation procedure of the laser machining apparatus according to the first embodiment of the present invention.

Next, an operating procedure of the laser machining apparatus according to the first embodiment of the present invention will be described with reference to a flowchart in FIG. 3.

To start with, it is assumed that the power outage occurs in step S101. Next, it is determined in step S102 whether the power outage continues. The power-down detection unit 4 detects the power being supplied to the laser machining apparatus from the external power source, thereby determining whether the power outage continues. When the power outage continues, the processing is looped back to step S102 in order to determine whether the power outage further continues. At this time, with the continuation of the power outage, the time measurement unit 11 measures a period of time for which the power supplied from the external power source 3 is kept equal to or smaller than a predetermined value.

When in a non-continuation state of the power outage, i.e., in the case of the power restoration, it is determined in step S103 whether power outage time, i.e., the time for which the power supplied from the external power source is kept equal to or smaller than the predetermined value, is equal to or larger than a first predetermined period of time.

When the power outage time is equal to or larger than the first predetermined period of time, i.e., when the time for which the power supplied from the external power source is kept equal to or smaller than the predetermined value, is equal to or larger than the first predetermined period of time, the laser oscillator or the equipment is not stopped in step S104.

Whereas when the power outage time is smaller than the first predetermined period of time, i.e., when the time for which the power supplied from the external power source is kept equal to or smaller than the predetermined value is smaller than the first predetermined period of time, the laser oscillator or the equipment is stopped in step S105.

As described above, after the power outage, in the case of using the equipment with the abnormal state being canceled after the first predetermined period of time has elapsed, the state of the equipment at a point of time when returned (restored) from the power outage can be known from a magnitude relationship between the power outage time and the first predetermined period of time. Then, it is determined whether the equipment is started up based on the state of the equipment, and hence the measure for the power restoration can be properly performed.

The description made so far has exemplified the instance determining whether the laser oscillator or the equipment is stopped on the basis of whether the power outage time becomes equal to or larger than the first predetermined period of time. However, the determination as to whether the laser oscillator or the equipment is stopped may also be made based on whether the equipment is in the abnormal state on the occasion of the power being restored. In other words, the laser machining apparatus or the equipment may be stopped when the equipment is in the abnormal state on the occasion of the power being restored, and may not be stopped whereas when the equipment is not in the abnormal state when the power is restored. Further, the first embodiment has exemplified the instance of stopping the laser oscillator by way of the example of stopping the laser machining apparatus; however, the control device may also be stopped without being limited to this instance.

[Second Embodiment]

Figure 4:
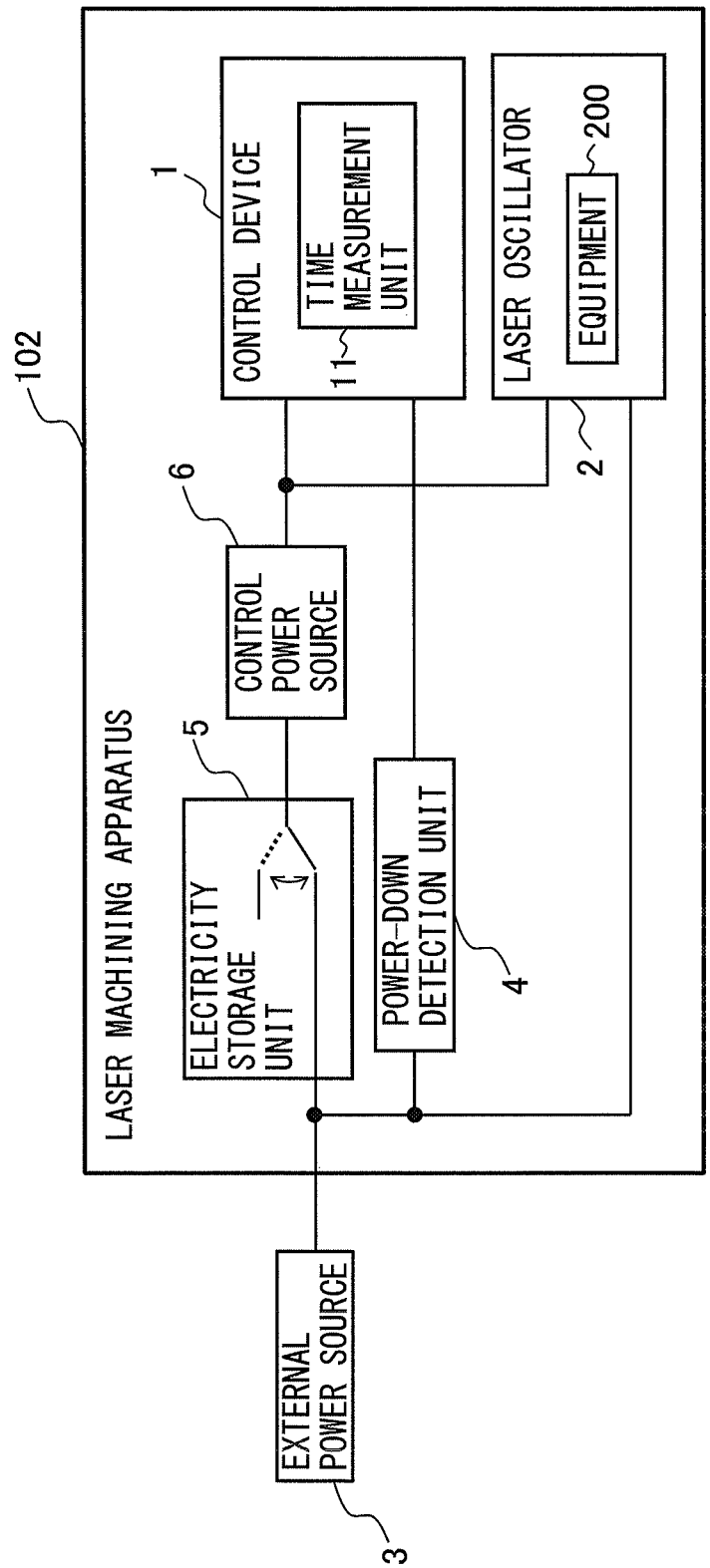
FIG. 4 is a block diagram of the laser machining apparatus according to a second embodiment of the present invention.

Next, a laser machining apparatus according to a second embodiment of the present invention will be described. FIG. 4 illustrates a block diagram of the laser machining apparatus according to the second embodiment of the present invention. A laser machining apparatus 102 according to the second embodiment of the present invention further includes: an electricity storage unit 5 configured to store the power supplied from the external power source 3 and to supply the power being equal to or larger than the predetermined value during a period until a second predetermined period of time elapses from when the supply power has decreased under the predetermined value; and a control power source 6 to receive the power from the electricity storage unit 5 and to supply the power to the laser oscillator 2 and the control device 1, the apparatus being characterized in that the control power source 6 operates to stop the laser oscillator when the power-down time becomes equal to or larger than the second predetermined period of time. Other configurations are the same as those in the first embodiment, and hence detailed descriptions thereof are omitted. Note that the laser oscillator 2 includes equipment 200 such as the inverter 25 and the laser power source 21 illustrated in FIG. 1.

The electricity storage unit 5 includes an electricity storage member such as a capacitor and is capable of supplying the power equal to or larger than the predetermined value, the power being sufficient for driving the laser machining apparatus for a fixed period of time (the second predetermined period of time) since the occurrence of the power outage of the external power source 3.

The control power source 6 receives the power from the electricity storage unit 5 and supplies the power to the control device 1 and the laser oscillator 2, respectively.

The power-down detection unit 4 monitors the power being supplied to the electricity storage unit 5 from the external power source 3, therefore detects whether the supply power becomes equal to or smaller than the predetermined value due to the power outage etc. of the external power source 3, and can transmit the detected data to the control device 1.

The laser machining apparatus according to the second embodiment of the present invention has the configuration as described above and is characterized in that the control power source 6 operates to stop the laser oscillator 2 when the power-down time becomes equal to or larger than the second predetermined period of time. An operation of the laser machining apparatus 102 according to the second embodiment of the present invention will be described.

Figure 5:
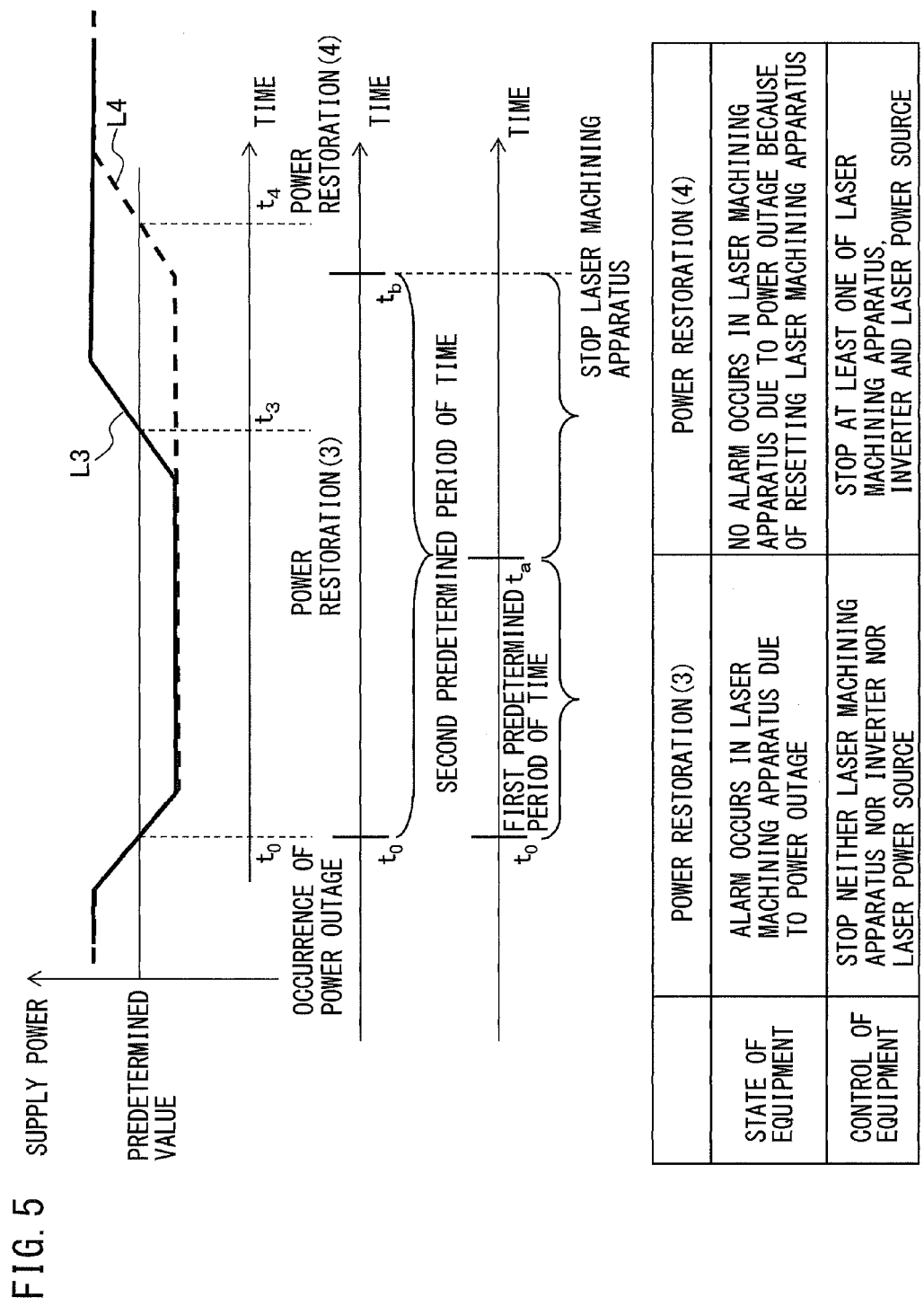
FIG. 5 is a diagram illustrating the relationship between the power-down of the supply power and the power restoration timing in the laser machining apparatus according to the second embodiment of the present invention, and the operation state of the equipment included in the laser machining apparatus.

FIG. 5 shows a relationship between the power-down of the supply power and the power restoration timing in the laser machining apparatus according to the second embodiment of the present invention, and an operating state of the equipment 200 included in the laser machining apparatus. A temporal variation of the supply power supplied from the external power source 3 is illustrated in an upper area of FIG. 5. A solid line L3 and a dotted line L4, as will be described later on, represent how such power restoration timing differs that the power temporarily decreasing down to the predetermined value or under returns to the predetermined value or above. To begin with, an assumption is that the power outage occurs at the timing $t_0$ and that the supply power before the occurrence of the power outage is equal to or larger than the predetermined value. After the supply power has decreased under the predetermined value subsequent to the occurrence of the power outage at the timing $t_0$, the power is restored after an elapse of a certain period of time. Herein, two cases of the power restoration are exemplified. A first power restoration case (3) is that the power is to be restored at timing $t_3$. On the other hand, a second power restoration case (4) is that the power is to be restored at timing $t_4$ ($t_4 > t_3$).

Herein, the electricity storage unit 5 includes, as described above, the electricity storage member such as the capacitor, and supplies the power equal to or larger than the predetermined value, the power being sufficient for driving the laser machining apparatus for a certain fixed period of time (the second predetermined period of time ($t_b - t_0$)) since the occurrence of the power outage of the external power source 3. FIG. 5 illustrates the timing $t_0$ when the power outage occurs and the timing $t_b$ when the second predetermined period of time elapses, together.

In the case of the power restoration (3), as shown in FIG. 5, the power restoration timing $t_3$ is earlier than the timing $t_b$ ($t_3 < t_b$) when the second predetermined period of time elapses. In other words, the power is supplied from the electricity storage unit 5 at the power restoration timing $t_3$, and hence the laser oscillator and the equipment 200 can operate normally.

On the other hand, in the case of the power restoration (4), as shown in FIG. 5, the power restoration timing $t_4$ is later than the timing $t_b$ ($t_4 > t_b$) when the second predetermined period of time elapses. Namely, the electricity storage unit 5 does not supply the power sufficient for driving the laser oscillator at the power restoration timing $t_4$, and hence the laser machining apparatus is stopped at the timing of the elapse of the second predetermined period of time. This configuration is contrived to stop the laser machining apparatus before exceeding power suppliable time of the electricity storage unit 5 in order to avoid the case where the control device 1 is not normally reset when the power is restored immediately after a stop of the power supply from the electricity storage unit 5.

As described above, the determination about whether to stop the laser oscillator is made in a manner that takes account of the supply power from the electricity storage unit at the power restoration timing of the external power source, thereby enabling the recovery after the power restoration to be made quickly.

Figure 6:
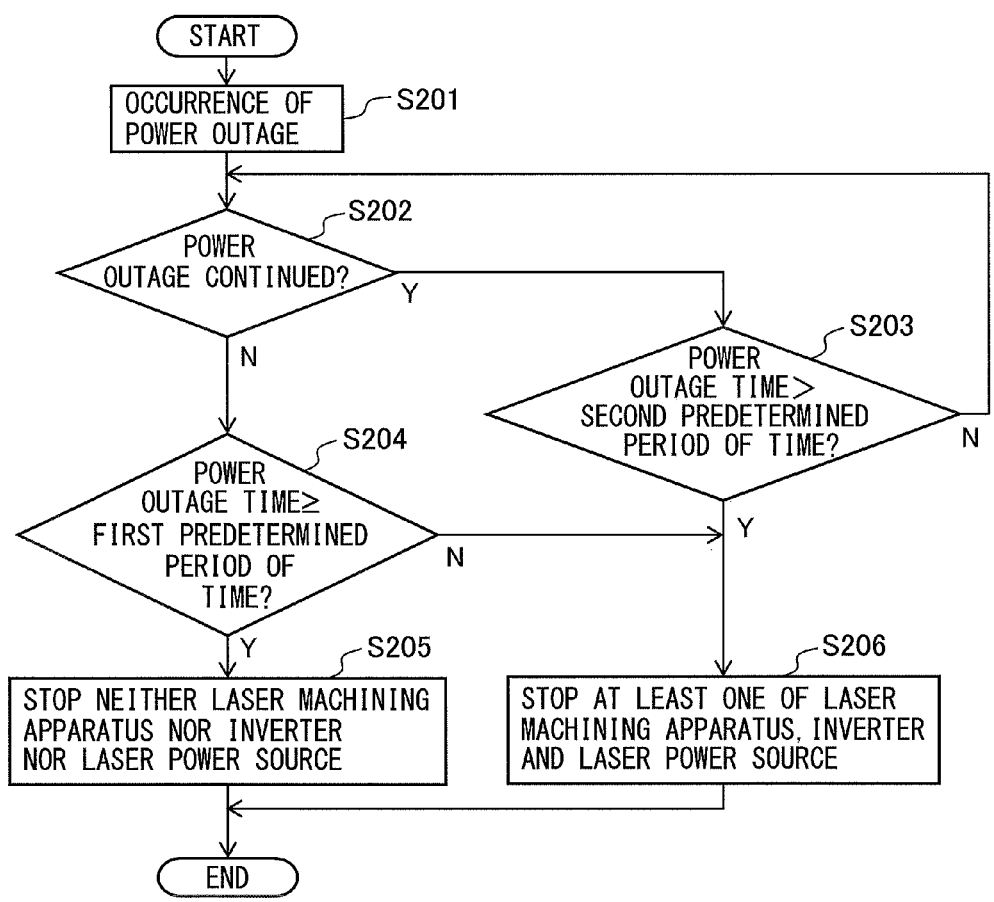
FIG. 6 is an explanatory flowchart of the operation procedure of the laser machining apparatus according to the second embodiment of the present invention.

Next, an operating procedure of the laser machining apparatus according to the second embodiment of the present invention will be described with reference to a flowchart of FIG. 6.

At first, it is assumed that the power outage occurs in step S201. Next, it is determined in step S202 whether the power outage continues. The power-down detection unit 4 detects the power being supplied to the laser machining apparatus 102 from the external power source 3, thereby determining whether the power outage continues. When the power outage continues, it is determined in step S203 whether the power outage time exceeds the second predetermined period of time.

In a non-continuing state of the power outage, i.e., when the power is restored, it is determined in step S204 whether the power outage time, i.e., the time for which the power supplied from the external power source is kept equal to or smaller than the predetermined value, is equal to or larger than the first predetermined period of time.

When the power outage time is equal to or larger than the first predetermined period of time, i.e., when the time for which the power supplied from the external power source is kept equal to or smaller than the predetermined value, is equal to or larger than the first predetermined period of time, neither the laser machining apparatus nor the inverter nor the laser power source is stopped in step S205.

Whereas when the power outage time is smaller than the first predetermined period of time, i.e., when the time for which the power supplied from the external power source is kept equal to or smaller than the predetermined value, is smaller than the first predetermined period of time, and further when the power outage time is more than the second predetermined period of time in step S203, at least one of the laser machining apparatus, the inverter and the laser power source is stopped in step S206.

As described above, in the case of using the electricity storage unit capable of supplying the power being equal to or larger than the predetermined value till the second predetermined period of time elapses after the power outage, if the power outage time exceeds the second predetermined period of time, the laser machining apparatus etc. is stopped beforehand when the second predetermined period of time elapses before the power outage occurs, thereby making it feasible to avoid such a situation that the control device is not normally reset through the power restoration.

[Third Embodiment]

Figure 7:
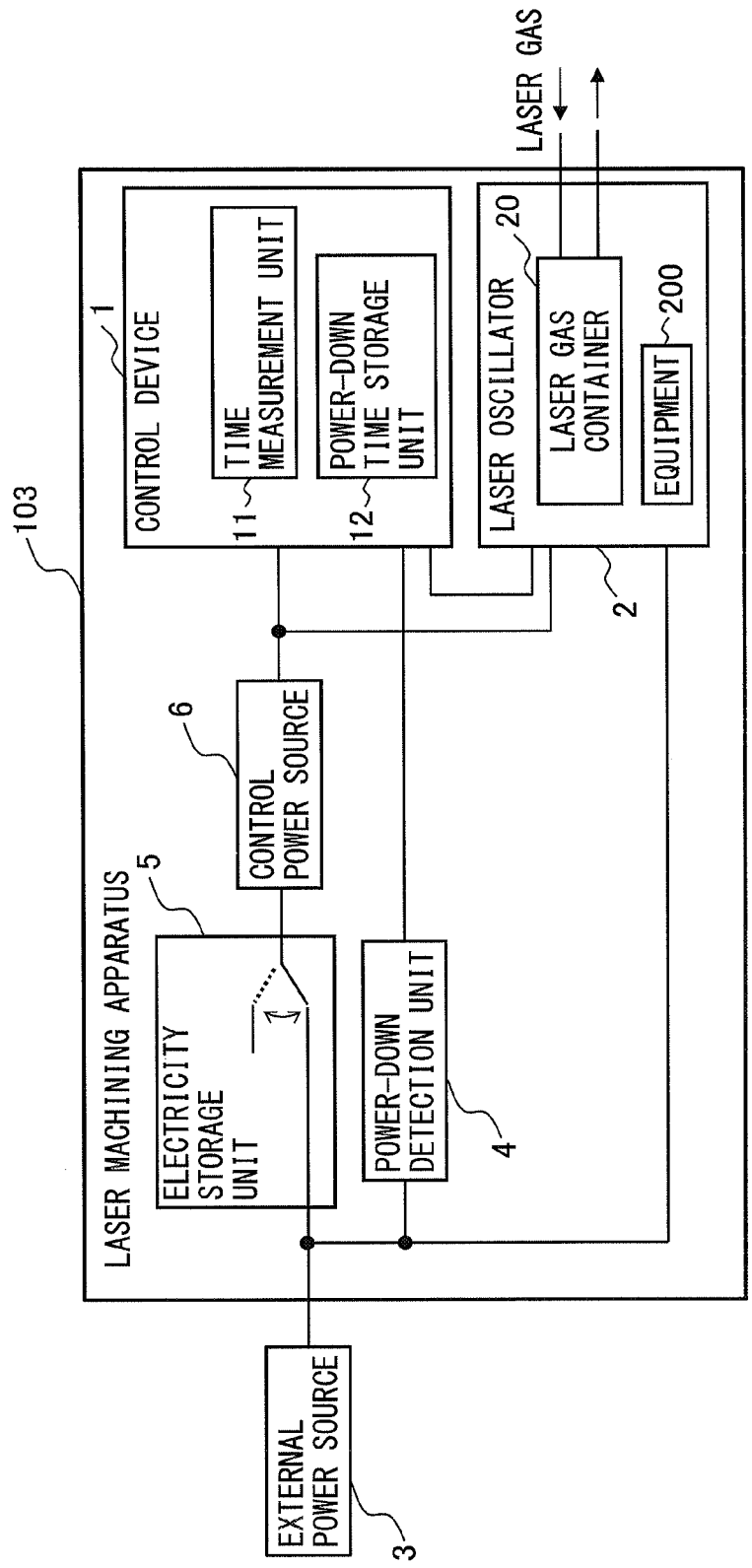
FIG. 7 is a block diagram of the laser machining apparatus according to a third embodiment of the present invention.

Next, a laser machining apparatus according to a third embodiment of the present invention will be described. FIG. 7 is a block diagram of the laser machining apparatus according to the third embodiment of the present invention. A laser machining apparatus 103 according to the third embodiment of the present invention further includes: a laser gas container 20 provided in the laser oscillator 2 and filled with a laser gas; and a power-down timing storage unit 12 configured to store power outage occurrence timing when the supply power decreases under the predetermined value and power restoration timing when the supply power is restored to a value equal to or larger than the predetermined value, the apparatus 103 being characterized in that the control device 1, when power-down time defined as period of time until the power restoration timing from the power outage occurrence timing is smaller than a third predetermined period of time, skips at least one of operations such as evacuating the laser gas container 20, filling the laser gas container 20 with the laser gas and warming up the laser oscillator 2 when starting up the laser oscillator. Other configurations are the same as those in the second embodiment, and hence the detailed descriptions are omitted.

The laser machining apparatus according to the third embodiment of the present invention lessens the state variation within the laser oscillator if the power-down time is short. Thus, a period of time for which the state variation within the laser oscillator is kept small, is referred to the third predetermined period of time. When the power-down time defined as the period of time until the power restoration timing from the power outage occurrence timing is smaller than the third predetermined period of time, there is the small state variation within the laser oscillator, whereby a laser machining enabled state can be attained while omitting a laser gas replacing operation and a warming-up operation that are necessary when performing a normal start-up.

Figure 8:
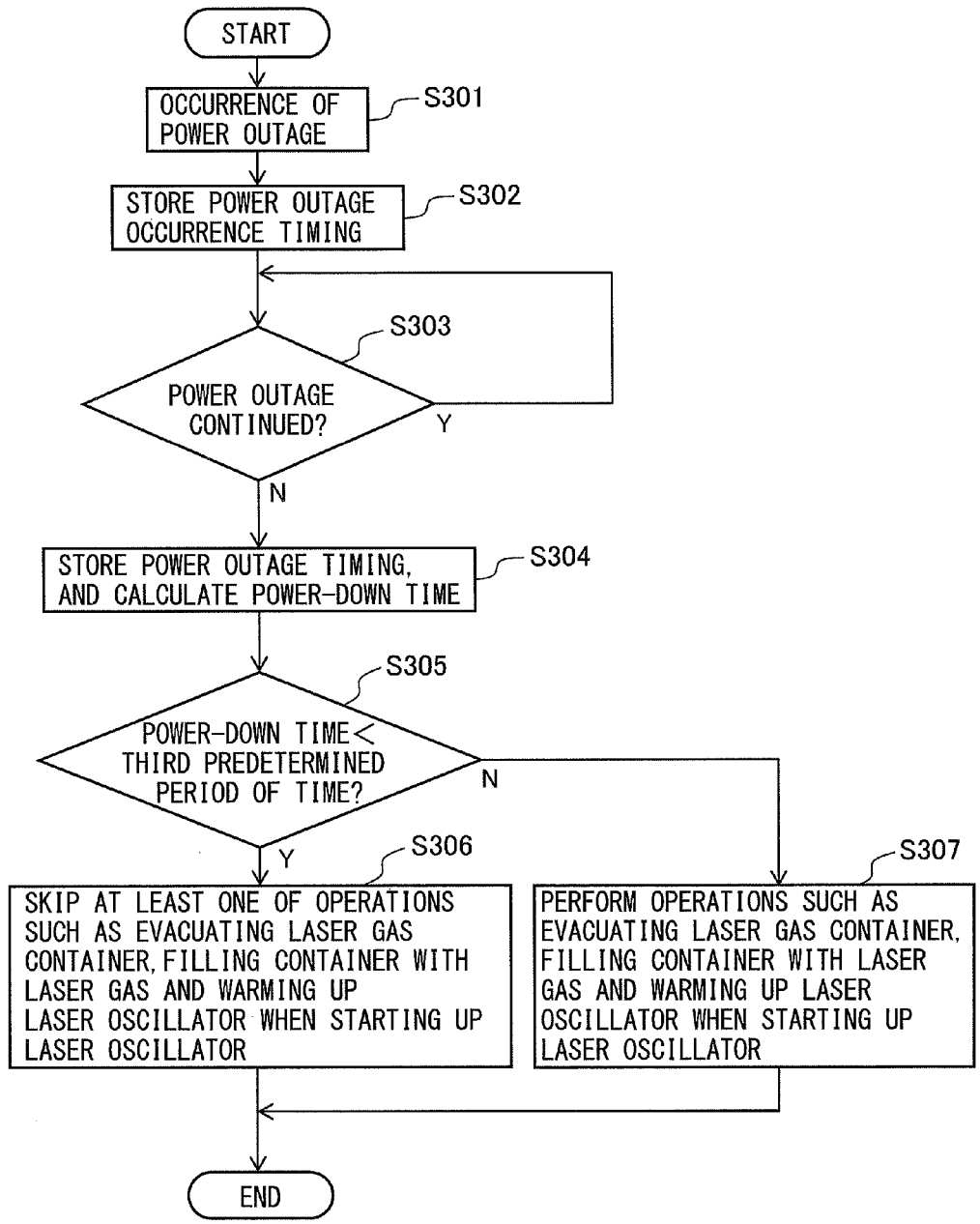
FIG. 8 is an explanatory flowchart of the operation procedure of the laser machining apparatus according to the third embodiment of the present invention.

Next, an operating procedure of the laser machining apparatus according to the third embodiment of the present invention will be described with reference to a flowchart of FIG. 8.

At first, it is assumed that the power outage occurs in step S301. Next in step S302, the power-down timing storage unit 12 stores the power outage occurrence timing. Then, it is determined in step S303 whether the power outage continues. When determining that the power outage continues, the processing is looped back to step S303 and continues monitoring whether the power outage continues.

Whereas when determining that the power is restored upon a stop of the power outage, in step S304, the power-down timing storage unit 12 stores the power restoration timing, and the time measurement unit 11 calculates the power-down time defined as the period of time from when the power outrage occurs until when the power is restored by use of the power outage occurrence timing and the power restoration timing, which are stored in the power-down timing storage unit 12.

Next in step S305, the control device 1 determines whether the power-down time is smaller than the third predetermined period of time. When the power-down time is smaller than the third predetermined period of time, in step S306, at least one of such operations is omitted, as evacuating the laser gas container 20, filling the laser gas container 20 with the laser gas and warming up the laser oscillator 2 when starting up the laser oscillator 2. Whereas when the power-down time is equal to or larger than the third predetermined period of time, such operations are carried out, as evacuating the laser gas container 20, filling the laser gas container 20 with the laser gas and warming up the laser oscillator 2 when starting up the laser oscillator 2.

[Fourth Embodiment]

Figure 9:
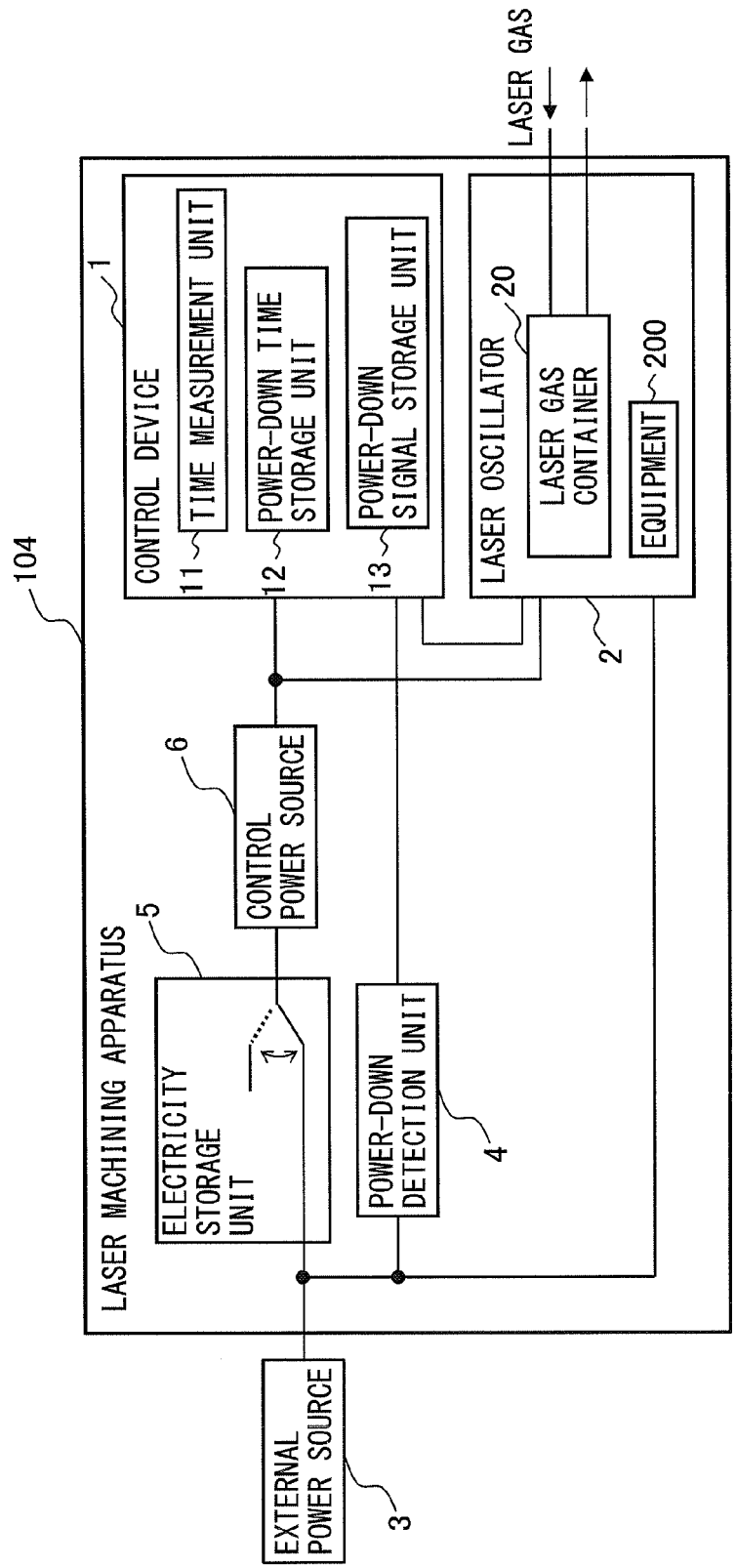
FIG. 9 is a block diagram of the laser machining apparatus according to a fourth embodiment of the present invention.

Next, a laser machining apparatus according to a fourth embodiment of the present invention will be described. FIG. 9 shows a block diagram of the laser machining apparatus according to the fourth embodiment of the present invention. A laser machining apparatus 104 according to the fourth embodiment of the present invention further includes a power-down signal storage unit 13 configured to store a power-down signal indicating that the supply power decreases under the predetermined value and a power return signal indicating that the supply power returns to the pre-determined value or above, the apparatus being characterized in that the control device 1 starts up the laser oscillator 2 on the basis of the power return signal when stopping the laser oscillator 2 on the basis of the power-down signal. Other configurations are the same as those in the second embodiment, and hence detailed explanations thereof are omitted.

The laser machining apparatus according to the fourth embodiment of the present invention is capable of improving an operating ratio of the laser machining apparatus by saving a labor and reducing the time for recovering the laser machining apparatus to the state before the power decreases.

Figure 10:
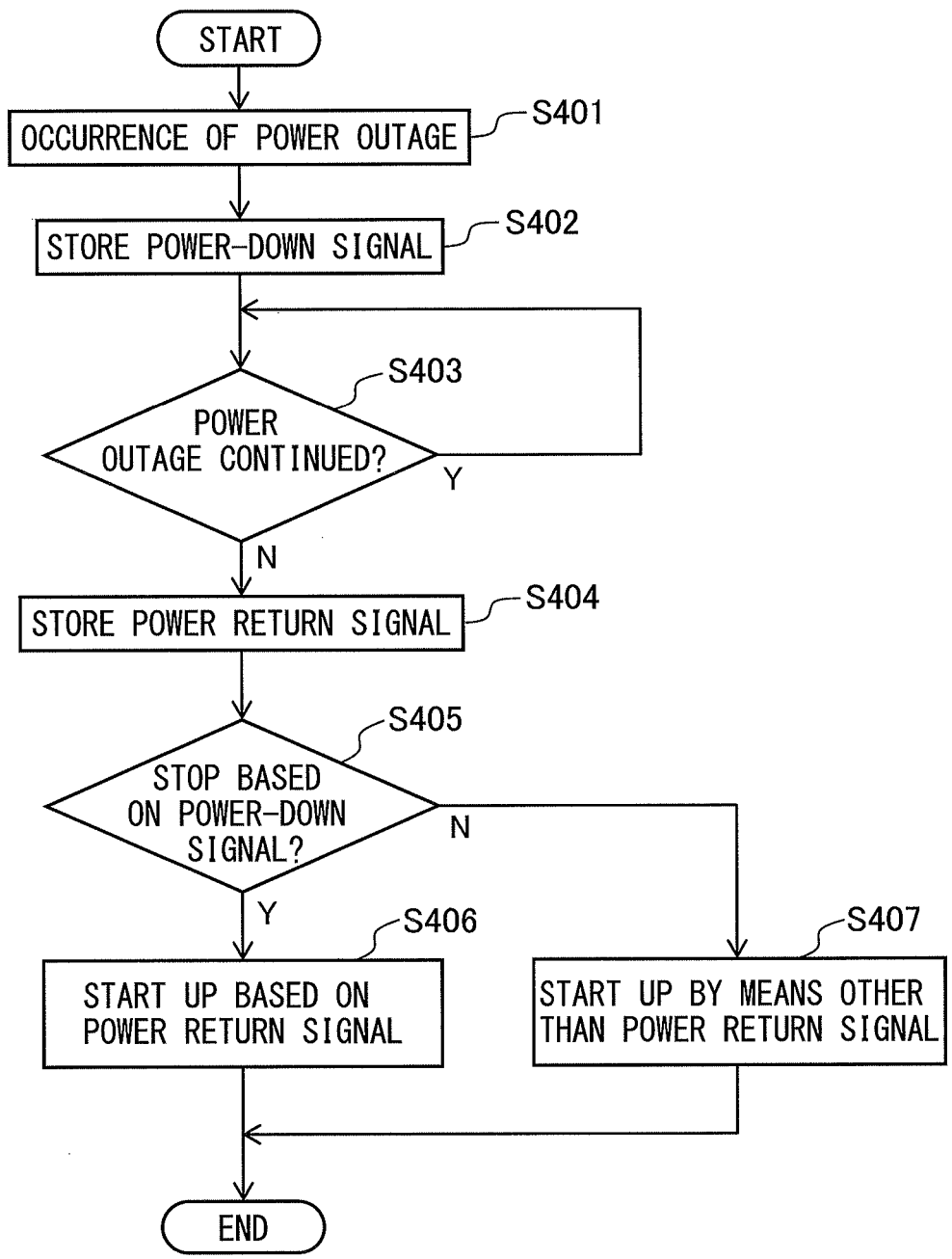
FIG. 10 is an explanatory flowchart of the operation procedure of the laser machining apparatus according to the fourth embodiment of the present invention.

Next, an operating procedure of the laser machining apparatus according to the fourth embodiment of the present invention will be described with reference to a flowchart of FIG. 10.

To start with, it is assumed that the power outage occurs in step S401. Next in step S402, the power-down signal storage unit 13 stores the power-down signal. Subsequently, it is determined in step S403 whether the power outage continues. When determining that the power outage continues, the processing is looped back to step S403 and continues monitoring whether the power outage continues.

Whereas when determining that the power is restored upon the stop of the power outage, the power-down signal storage unit 13 stores the power return signal in step S404.

Next, in step S405, it is determined whether the control device 1 stops the laser oscillator 2 on the basis of the power-down signal. When the control device 1 stops the laser oscillator 2 on the basis of the power-down signal, the laser oscillator 2 is started up based on the power return signal in step S406. Whereas when the laser oscillator 2 is stopped by a means other than receiving the power-down signal, the laser oscillator 2 is started up by a means exclusive of the power return signal in step S407.

As described above, if it is previously confirmed that the laser machining apparatus is stopped due to the decrease in the supply power from the external power source, the operating labor can be saved by starting up the laser machining apparatus automatically upon the return of the supply power from the external power source. While on the other hand, the laser machining apparatus is stopped due to a cause other than the decrease in the supply power from the external power source, such a case is assumed that the laser machining apparatus is stopped due to a factor excluding the power-down, and hence another case may also happen, in which it is undesirable to start up the laser machining apparatus simultaneously with the power restoration. Such being the case, the laser machining apparatus according to the fourth embodiment of the present invention is configured so that the control device 1, when stopping the laser oscillator 2 by the means other than the power-down signal, starts up the laser machining apparatus by the means exclusive of the power restoration signal.

[Fifth Embodiment]

Figure 11:
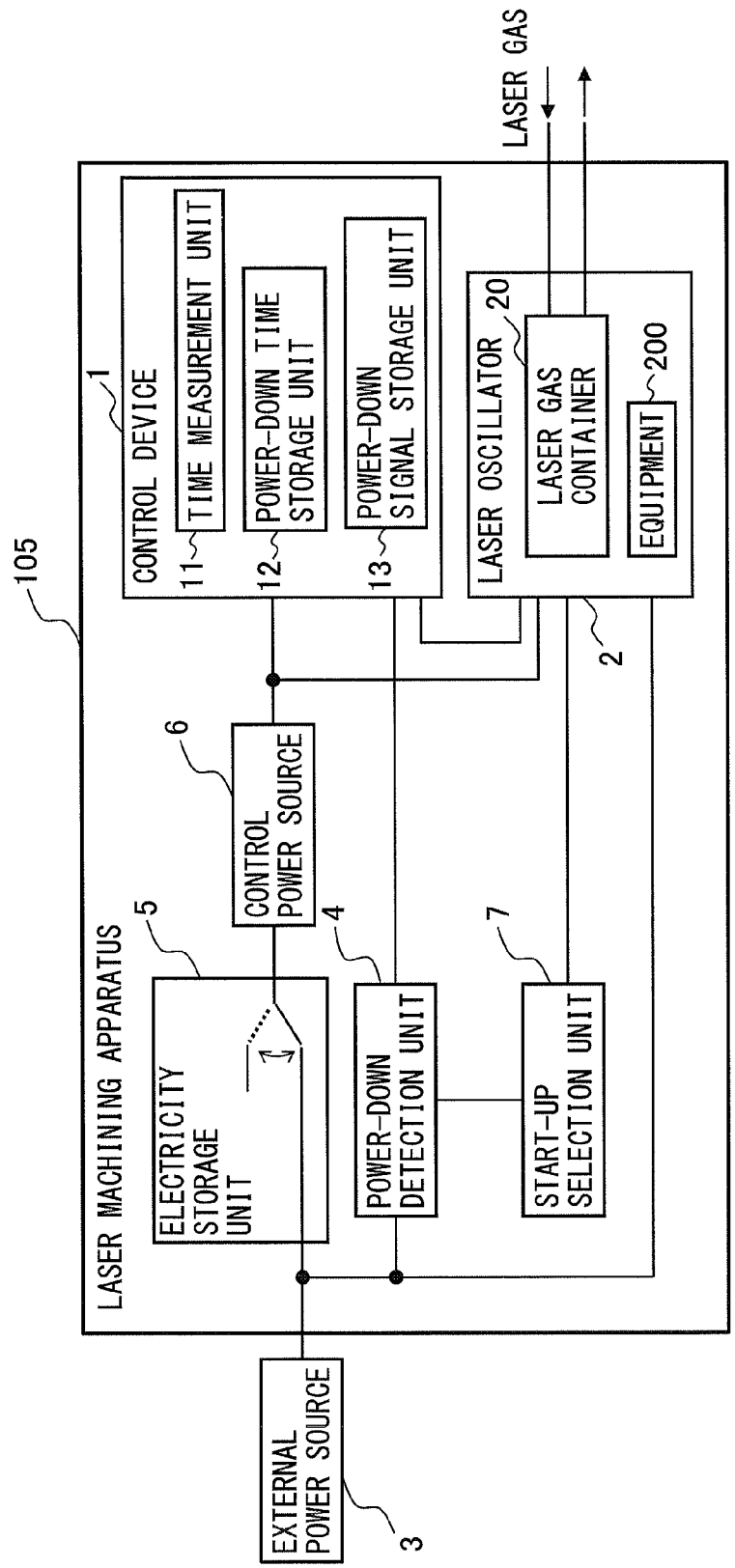
FIG. 11 is a block diagram of the laser machining apparatus according to a fifth embodiment of the present invention.

Next, a laser machining apparatus according to a fifth embodiment of the present invention will be described. FIG. 11 shows a block diagram of the laser machining apparatus according to the fifth embodiment of the present invention. A laser machining apparatus 105 according to the fifth embodiment of the present invention further includes a start-up selection unit 7 that selects whether to start up the laser oscillator 2, the apparatus 105 being characterized in that when the control device 1 stops the laser oscillator 2 due to the supply power's decreasing under the predetermined value, it is determined whether to start up the laser oscillator 2 by the start-up selection unit 7 when the power supply is restored to a value equal to or more than the predetermined value. Other configurations are the same as those in the third embodiment, and hence detailed explanations thereof are omitted.

The laser oscillator 2 is stopped when the supply power supplied to the laser oscillator 2 decreases under the predetermined value, however, such a case may happen that the laser oscillator being temporarily stopped spontaneously starts up when the supply power thereafter becomes equal to or larger than the predetermined value upon the power restoration. In such a case, if the laser beams are radiated from the laser oscillator deemed to be stopped due to the power outage, it is considered that a problem arises in terms of safety. This being the case, a contrivance of the laser machining apparatus 105 according to the fifth embodiment of the present invention is to provide the start-up selection unit 7 to select whether to start up the laser oscillator 2, the configuration being such that the start-up selection unit 7 determines whether the laser oscillator 2 is started up when the supply power returns to the predetermined value if the control device 1 stops the laser oscillator 2 due to the supply power's decreasing under the predetermined value. As a result, it is possible to prevent the laser machining apparatus from unintentionally starting up after the power restoration.

Figure 12:
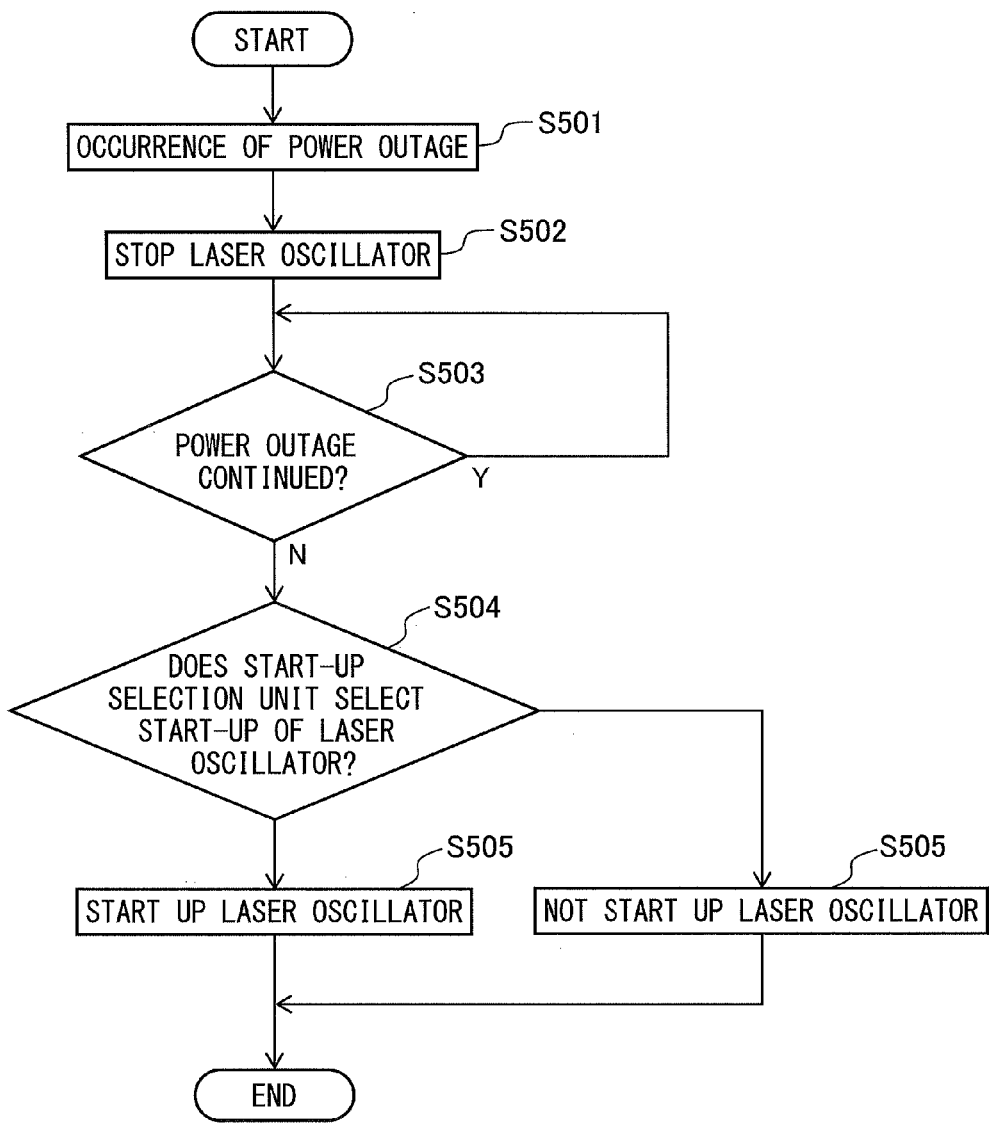
FIG. 12 is an explanatory flowchart of the operation procedure of the laser machining apparatus according to the fifth embodiment of the present invention.

Next, an operating procedure of the laser machining apparatus according to the fifth embodiment of the present invention will be described with reference to a flowchart of FIG. 12.

To begin with, it is assumed that the power outage occurs in step S501. Next in step S502, the control device 1 stops the laser oscillator 2.

Subsequently, it is determined in step S503 whether the power outage continues. When determining that the power outage continues, the processing is looped back to step S503 and continues monitoring whether the power outage continues.

Whereas when determining that the power is restored upon the stop of the power outage, the start-up selection unit 7 of the laser oscillator selects in step S504 whether to start up the laser oscillator 2. When the start-up selection unit 7 determines to start up the laser oscillator 2, the start-up selection unit 7 causes the laser oscillator 2 to start up in step S505. Whereas when the start-up selection unit 7 determines not to start up the laser oscillator 2, the start-up selection unit 7 does not cause the laser oscillator 2 to start up in step S505.

As described above, the laser machining apparatus according to the fifth embodiment of the present invention can also properly take the measure when the power is restored from the power outage because of not automatically starting up the laser oscillator after the power restoration in all cases and determining whether to start up the laser oscillator in terms of ensuring the safety etc.

The discussion given above has described so far the factor for causing the decrease in the supply power by exemplifying the case of the power outage, however, without being limited to this decrease as the factor for causing the power-down, the present invention can be also applied to cases in which the supply power decreases due to other factors.

There is an abnormality of the equipment such as the inverter Or the power source for excitation, which are operated by the external power source included within the laser machining apparatus, when the power-down time is short and the abnormal state is kept after restoration of the power-down. If the power-down time is longer than a predetermined time, the abnormal state is canceled by itself, and the equipment can be used simultaneously with the power restoration. Based on this configuration, according to the present invention, in the case of the power-down for the time shorter than the predetermined period of time, or in the case of the abnormality occurring in the equipment when the power is restored, the start-up can be promptly attained by cancelling the abnormality in the equipment while stopping the laser machining apparatus or the equipment. Conversely in the case of the power-down for the time longer than the predetermined period of time or in the case of the abnormality not occurring in the equipment when the power is restored, the laser machining apparatus can be recovered to the state before the power-down within the short time by stopping neither the laser machining apparatus nor the equipment.

What is claimed is:

1. A laser machining apparatus comprising:
a laser oscillator;
a control device configured to control the laser oscillator;
a power-down detection unit configured to detect a decrease in supply power supplied to the control device and the laser oscillator from an external power source;
a time measurement unit configured to measure a period of power-down time from when the supply power is decreased under the predetermined value until the supply power is returned to a predetermined value;
an electricity storage unit configured to supply electric power to the control device when the supply power decreases; and
an inverter provided within the laser oscillator, configure to operate abnormally when the supply power is decreased under the predetermined value, and to recover from an abnormal operation upon continuation of a state of the supply power being smaller than the predetermined value in excess of a first predetermined period of time,
wherein the control device stops the laser machining apparatus or the inverter when the power-down time is smaller than the first predetermined period of time on such an occasion that the supply power returns to a value equal to or larger than the predetermined value and does not stop the laser machining apparatus or the inverter when the power-down time is equal to or larger than the first predetermined period of time on such an occasion that the supply power returns to the value equal to or larger than the predetermined value.

2. A laser machining apparatus comprising:
a laser oscillator;
a control device configured to control the laser oscillator;
a power-down detection unit configured to detect a decrease in supply power supplied to the control device and the laser oscillator from an external power source;
a time measurement unit configured to measure a period of power-down time from when the supply power is decreased under the predetermined value until power supply is returned to a predetermined value;
an electricity storage unit configured to supply electric power to the control device upon the supply power decreases; and
an inverter provided within the laser oscillator, configure to operate abnormally when the supply power is decreased under the predetermined value, and to recover from the abnormal operation upon continuation of a state of the supply power being smaller than the predetermined value in excess of a first predetermined period of time,
wherein the laser machining apparatus or the inverter is stopped when the inverter is in an abnormal state on such an occasion that the supply power returns to a value equal to or larger than the predetermined value and is not stopped when the inverter is not in the abnormal state on such an occasion that the supply power returns to the value equal to or larger than the predetermined value.

3. The laser machining apparatus according to claim 1, further comprising a control power source configured to receive the electric power from the electricity storage unit and supply the electric power to the laser oscillator and the control device,
wherein the electricity storage unit stores the supply power from the external power source and supplies the electric power being equal to or larger than the predetermined value for a period until an elapse of a second predetermined period of time from a decrease in the supply power under the predetermined value, and
wherein the control power source stops the laser oscillator when the power-down time is equal to or larger than the second predetermined period of time.

4. The laser machining apparatus according to claim 1, further comprising:
a laser gas container provided in the laser oscillator and filled with a laser gas; and
a power-down timing storage unit configured to store power outage occurrence time when the supply power decreases under the predetermined value, and power restoration time when the supply power returns to a value equal to or larger than the predetermined value,
wherein the control device skips at least one operation among, evacuating the laser gas container, filling the laser gas container with the laser gas and warming up the laser oscillator at a start-up of the laser oscillator upon the power-down time being smaller than a predetermined period of time, the power-down time being defined as a period of time from when the power outage occurs until when the power is restored.

5. The laser machining apparatus according to claim 1, further comprising a power-down signal storage unit configured to store a power-down signal indicating a decrease in the supply power under the predetermined value, and a power return signal indicating a return of the supply power to a value equal to or larger than the predetermined value,
wherein the control device stops the laser oscillator based on the power-down signal or by a means other than the power-down signal, and
wherein the control device starts up the laser oscillator based on the power return signal upon stopping the laser oscillator based on the power-down signal and the control device starts up the laser oscillator by a means exclusive of the power return signal when stopping the laser oscillator by a means other than the power-down signal.

6. The laser machining apparatus according to claim 5, further comprising a start-up selection unit configured to select whether to start up the laser oscillator,
    wherein the start-up selection unit selects whether to start up the laser oscillator at the time of the supply power returning to the value equal to or larger than the predetermined value when the control device has stopped the laser oscillator due to the decrease in the supply power under the predetermined value.

\* \* \* \* \*